FRUIT HANDLING MACHINERY

Filed April 9, 1963 11 Sheets-Sheet 1

INVENTORS
JOHN D. CANTONI
ALFRED W. GERRANS
BY
Mellin and Hanscom
ATTORNEYS

INVENTORS
JOHN D. CANTONI
ALFRED W. GERRANS
BY
Mellin and Hanscom
ATTORNEYS

INVENTORS
JOHN D. CANTONI
ALFRED W. GERRANS
BY
Mellin and Hanscom
ATTORNEYS

INVENTORS
JOHN D. CANTONI
ALFRED W. GERRANS
BY Mellin and Hanscom
ATTORNEYS

INVENTORS
JOHN D. CANTONI
ALFRED W. GERRANS

BY
Mellin and Hanscom
ATTORNEYS

FRUIT HANDLING MACHINERY

Filed April 9, 1963

INVENTORS
JOHN D. CANTONI
ALFRED W. GERRANS
BY
Mellin and Hanscom
ATTORNEYS

FRUIT HANDLING MACHINERY

Filed April 9, 1963 11 Sheets-Sheet 7

INVENTORS
JOHN D. CANTONI
ALFRED W. GERRANS
BY
Mellin and Hanscom
ATTORNEYS

Feb. 15, 1966 J. D. CANTONI ETAL 3,234,984

FRUIT HANDLING MACHINERY

Filed April 9, 1963 11 Sheets-Sheet 8

INVENTORS
JOHN D. CANTONI
ALFRED W. GERRANS
BY Mellin and Hanscom
ATTORNEYS

FRUIT HANDLING MACHINERY

Filed April 9, 1963

11 Sheets-Sheet 9

INVENTORS
JOHN D. CANTONI
ALFRED W. GERRANS

BY Mellin and Hanscom
ATTORNEYS

INVENTORS
JOHN D. CANTONI
ALFRED W. GERRANS
BY Mellin and Hanscom
ATTORNEYS

INVENTORS
JOHN D. CANTONI
ALFRED W. GERRANS
BY
Mellin and Hanscom
ATTORNEYS

United States Patent Office 3,234,984 Patented Feb. 15, 1966

3,234,984

FRUIT HANDLING MACHINERY

John D. Cantoni and Alfred W. Gerrans, San Jose, Calif., assignors to Sunsweet Growers, Inc., San Jose, Calif., a corporation of California Filed Apr. 9, 1963, Ser. No. 271,793
28 Claims. (Cl. 146—224)

This invention relates to fruit handling machinery and more particularly involves a machine and methods for selecting, orienting, shaping and pitting a dried drupaceous fruit, such as prunes.

It is well known in the fruit pitting art that dried prunes present a special problem with respect to removal of their pit. This is largely true because the dried prunes have irregular and non-uniform shapes. Furthermore, prunes tend to be extremely sticky, especially when they are heated or become moist, thereby making them difficult to handle by machinery alone.

In general, the present invention comprises a unitary machine structure that is capable of receiving dried drupaceous fruit, particularly prunes in bulk quantity, and causing those prunes to be separated, oriented, shaped into a substantially uniform cylindrical form, oriented relative to a pitting plunger, pitted, reshaped and finally discharged into a chute or conveyor. While it is believed that there are many points of inventive novelty disclosed herein, one basic object of this invention is to provide a fruit handling machine that is especially suitable for use in the pitting of prunes.

Another object of this invention is to provide a machine of the kind described that will condition or shape a prune to enhance pitting thereof in a manner causing least injury to the flesh of the prune.

Another object is to provide a machine of the kind described including methods for separating prunes from a bulk supply and transfer them individually to a pitting station.

Another object of the invention is to provide a machine of the kind described, comprising a fruit supporting plate and a roller conveyor that includes roller members longitudinally movable relative to the plate, said plate and roller conveyor being inclined at a vertical angle such that the weight of a piece of fruit supported by the roller members will be less than but approximately equal to the weight of fruit supported upon the plate. The additional weight of one piece of fruit against another, which is contacted by the roller, will cause the piece of fruit contacted by the roller to be rolled over the top of the roller, leaving one piece of fruit by itself and selectively moved toward a pitting station.

A further object of the invention is to provide a machine of the kind described including novel mechanism for conditioning each piece of fruit in a continuous line operation and feeding the fruit pieces separately to a pitting station.

Another object is to provide machines and methods that will condition each piece of fruit prior to pitting in a manner that centers the pit relative to the flesh. With regard to the pitting of prunes, this is of considerable importance, since in the drying process the prune pits tend to settle toward the supporting side of the prune and are, therefore, not usually located centrally in the flesh, making pitting difficult if not impossible.

It is another object of the invention to provide a machine and method that will condition fruit prior to pitting by rolling the fruit along its major axis on a supporting surface to give it a cylindrical shape, centralizing the pit and massaging the flesh to break it loose from the pit and make it easier to handle during pitting.

A still further object is to provide a machine of the kind described including a pitting turret having a plurality of fruit receiving buckets that will pick up separate pieces of fruit from a central feed line, and after approximately 180° turret rotation discharge the pitted fruit into a hopper or chute.

Another object is to provide a machine of the kind described including a pitting turret having a plurality of prune receiving buckets, each bucket having a separate pitting plunger and group of gripping fingers, and wherein each operating device is cyclically operated by cams to positively position a prune relative to a pitting plunger and a pitting extractor cup, to pit the prune, to remove the fruit from the extractor cup, to reshape the fruit and close the axial openings therein, and to discharge the prune into a hopper.

Another object is to provide a machine of the kind described including novel means for clamping a prune to position the prune pit relative to a pitting extractor cup. The novel clamping means insures excellent alignment of the pit, thereby allowing the pit to be removed with little damage to the flesh and with a minimum of pit fractures. Moreover, the prunes will be gripped by the clamping means in a positive manner each time, and even though the angular orientation of the prune pit upon its major axis varies.

And yet another object of the invention is to provide a machine and methods of the type described whereby dried drupaceous fruit may be supported and pitted with a pitting plunger while allowing the flesh of the fruit to expand.

A further object is to provide a machine and methods of the type described for pitting a drupaceous fruit whereby the fruit is reshaped after pitting to close the pitting bore and to form prunes having a better appearance.

Other objects of this invention will become apparent in view of the following detailed description and the accompanying drawings.

In the drawings forming a part of this application and in which like parts are identified by like reference numerals throughout the same, FIG. 1 is a side elevation showing a fruit orienting, shaping and pitting machine embodying the present invention;

*Apparatus in general*

Figure 1:
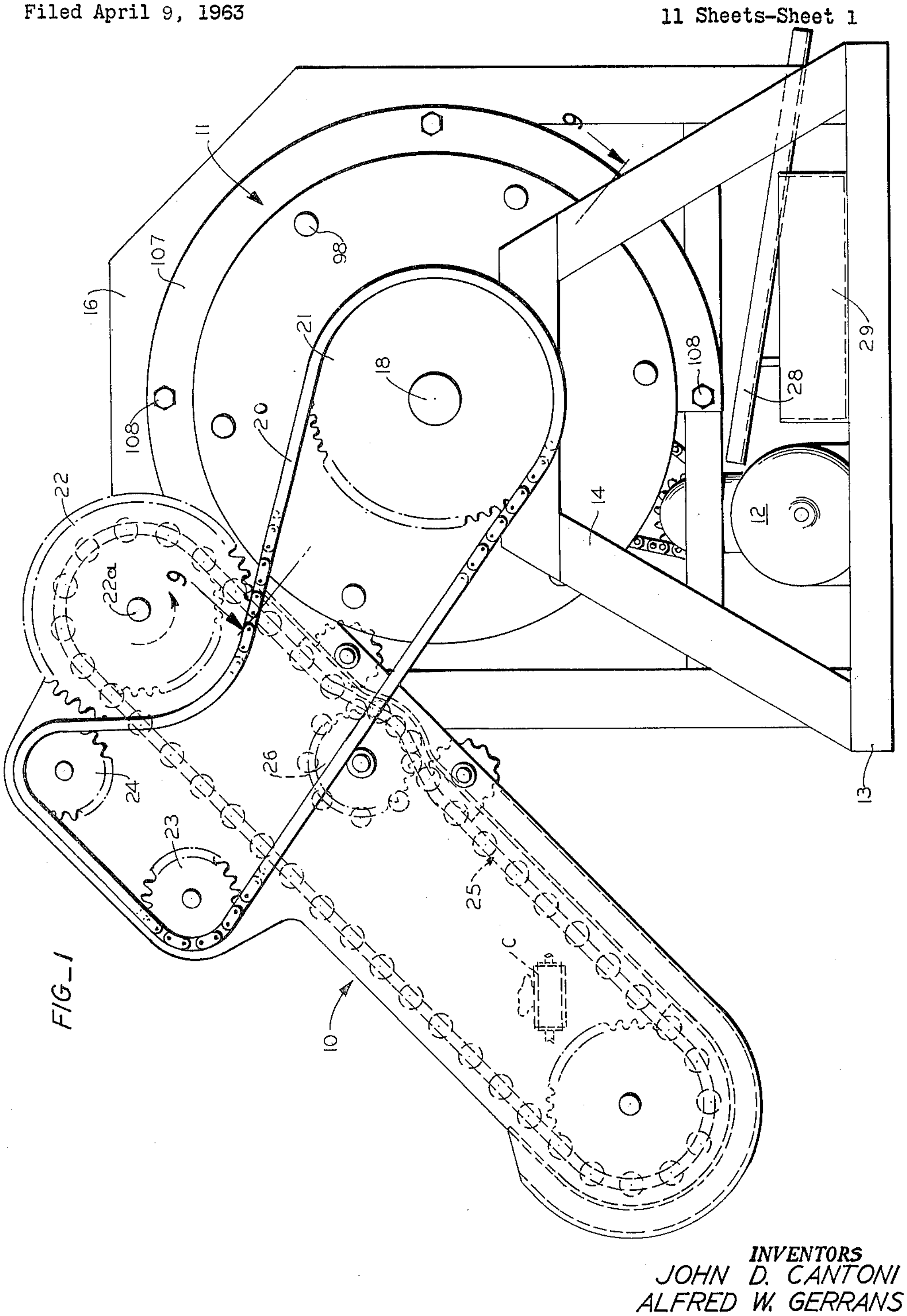
Figure 2:
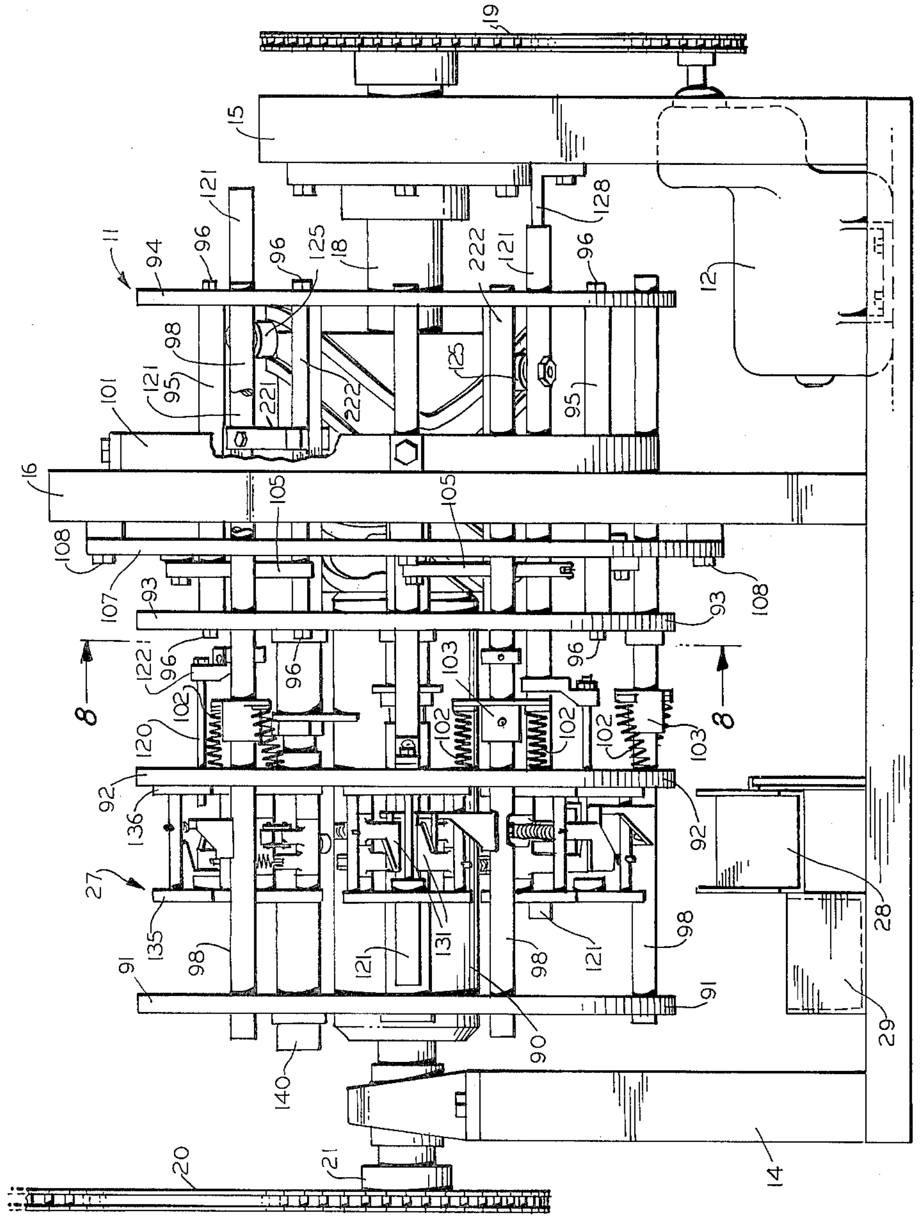
FIG. 2 is an elevation looking at the machine of FIG. 1 from the right side.

Referring to FIGS. 1 and 2 in particular, the embodiment of the invention shown comprises in general a fruit orienting and shaping device 10 and a pitting apparatus 11, both of which are driven by a motor 12. The fruit orienting and shaping device 10 and pitting apparatus 11 are supported by common framework comprising a platform 13, a pair of end frames 14 and 15 and an inverted U-shaped frame 16 disposed intermediate frames 14 and 15. Motor 12 drives a turret shaft 18 of apparatus 11 through a chain drive 19, and the fruit orienting device 10 is driven from the opposite end of shaft 18 by a drive connection consisting of chain 20, sprockets 21 and 22 and a pair of idler pinions 23 and 24. Sprocket 22 is rigidly secured to a shaft **22*a***.

The machine shown is operated in a manner such that prunes, or dried drupaceous fruits, are fed into the lower region of device 10 in a continuous flow as by means of standard conveyor equipment indicated schematically in FIG. 1 and referenced by the letter C. The prunes fall into a hopper of device 10 and are picked up by a roller conveyor 25. The prunes are rolled into substantially cylindrical shapes and the pits therein are partially oriented by means of a rotatable roller turret 26. Thereafter, they are deposited onto a tray or shelf and picked up by one of a plurality of fruit receiving buckets mounted on a turret head 27 of the pitting machine 11. Within approximately 180° rotation of turret head 27, the prunes are completely pitted and are deposited in a chute 28 disposed beneath the turret head, the pits thereof falling into a pit basin 29.

*Description of orienting and shaping apparatus*

Referring to FIGS. 3–6 in particular, prune orienting and shaping device 10 comprises a pair of side plates 30 and 31 having a curved hopper plate 32 at its lower end connected therebetween. A support plate 33 provides a narrow supporting surface extending upward from hopper plate 32 and terminating at a cross plate member 34. A pair of convergent guide plates 35 and 36 are mounted to cross plate 34 for centering prunes that are being moved upwardly along plate 33 by means of roller conveyor 25 including rollers 37, said rollers having a concave cylindrical surface. As prunes are moved off the upper end of cross plate 34, they are deposited onto a bifurcated support tray or shelf 38 where they are picked up by a bucket forming a part of pitting machine 11.

It will be noted that rollers 37 are rotatably connected between chains 39, each chain passing around a pair of sprockets 40 including sprockets keyed to shaft **22*a*. Each roller 37 is formed integrally with a pair of coaxial friction rollers 41 and 42, each of which engages one of a pair of friction bars 43 respectively supported from side plates 30 and 31 by means of straps 45 and 46. Rollers 41 and 42 are held against bars 43 by chain guide rails 47 mounted from hopper plate 32 and cross plate 34**.

A roller turret, which has been referenced in general by the member 26, is supported upon a shaft 50 secured to plates 30 and 31 by means of pairs of collars 51 and 52, each having set screws 53. A sprocket 54 is mounted to the end of a tubular shaft 55 that forms a part of the roller turret, said sprocket being meshed with a chain 39. Tubular shaft 55 supports a pair of star plates 56 and 57 having a plurality of roller members 58 rotatably mounted therebetween. Rollers 58 are supported by bolts 59 which are also used for coaxially attaching a roller member 60 to each roller 58. A guide sprocket 61 is mounted on the end of shaft 50 opposite from sprocket 54, and the sprocket 61 meshes with the other chain 39.

Figure 6:
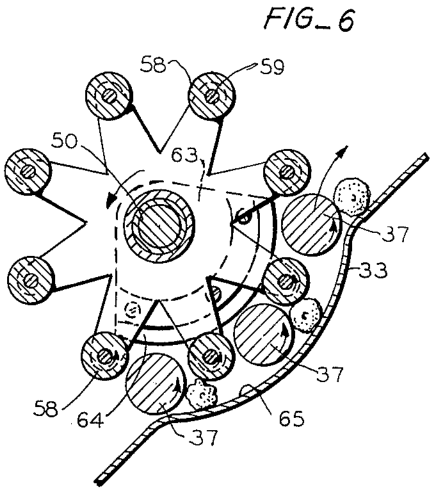
FIG. 6 is a section taken on lines 6—6 of FIG. 5.
Figure 5:
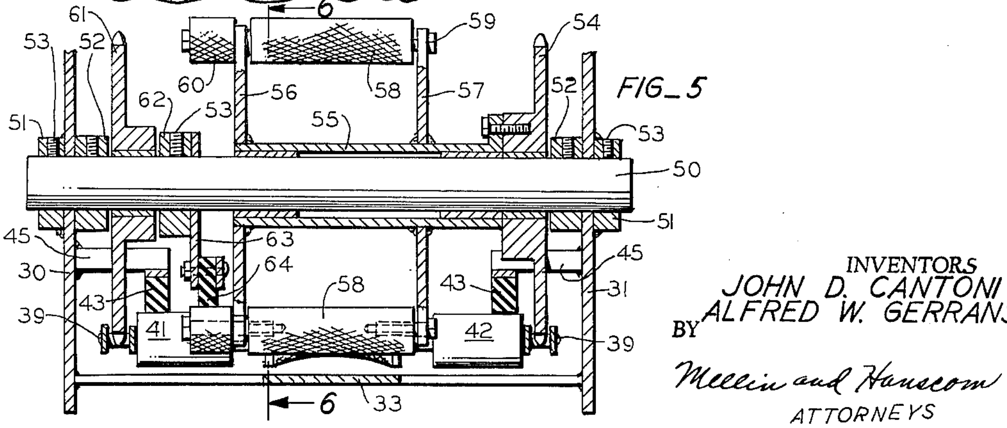
FIG. 5 is a section taken on lines 5—5 of FIG. 4, showing the relationship between prune alignment rollers and prune shaping rollers.

A collar 62 is rigidly attached to stationary shaft 50 by means of a set screw 53, and to this collar there is mounted a support plate 63 carrying an arcuate friction shoe 64. Referring to FIG. 6, it will be seen that support plate 33 is formed with a concave surface 65 located opposite roller turret 26. Furthermore, as roller members 58 are rotated about shaft 50 they pass above surface 65 but within its curvature and in close proximate relationship thereto. The spacing between rollers 58 and the surface 65 is such that the prunes which are being moved along the surface are rolled by rollers 58 until shaped into a substantially cylindrical form. This operation is accomplished not merely by the rotation of the turret 26 but also by the secondary rotational movement of the rollers 58 which occurs when rollers 60 come into engagement with the friction shoe 64 as the roller turret 26 revolves upon shaft 50.

Referring again to FIG. 3, the chains 39 are guided by pairs of sprockets 70 and 71, both of which are mounted from the side plates 30 or 31. Sprockets 70 and 71 urge rollers 42 into a surface engagement with the friction bar 43. It will be evident, therefore, that as chains 39 move in a generally counter-clockwise direction, as viewed in FIGS. 1 and 3, rollers 37 begin rotating in a counter-clockwise direction also, that will sweep the prunes upward and along the support plate 33.

In operation, prunes may be fed into the hopper 32 as by conveyor C. It is desirable that a surplus of prunes be maintained in the hopper in order to insure that at least one prune will be picked up by each roller 37 as it passes along the bottom of the hopper. Should more than one prune be picked up by any given roller 37, all but one of those prunes will be discharged from the roller before it arrives at the turret 26. This is accomplished in part by making the vertical incline of support plate 33 approximately 45°, or such that a single prune will fall in front of and against the roller with a nearly equal distribution of the prune's weight against the roller and the support plate. Importantly, also, rollers 37 move with an upward sweeping motion that will roll and not skid the prune up the inclined surface of plate 33.

As the rollers 37 emerge from hopper plate 32 and begin passing along plate 33, the area of support is immediately narrowed to a restricted width. In fact, all prunes ahead of rollers 37, except those remaining in the concave area of the rollers, will drop from the upper edge of the hopper plate or the lateral edges of plate 33. Usually only one prune will emerge from the hopper while being supported upon plate 33 and contacted by a roller 37. However, in case two prunes remain in the concave area of a roller 37, both resting against the roller, one of these will be forced laterally off the narrow supporting surface provided by the support plate. The rotational movement of the rollers 37, together with their concave cylindrical configuration tends to move one or the other prune in toward the center as a result of the natural physical differences between prunes such as weight differences and variations in shape. Thus, one prune will eventually force the other laterally until it falls from the support plate.

In the case of two prunes being disposed in front of the roller 37, one in front of the other and in substantial alignment with the concave portion of the roller, the additional weight of one prune against another which rests against the roller will cause the prune resting against the roller to roll over the top of the roller leaving the said one prune in front and by itself.

As excess prunes fall from the upper edge of hopper 32 or the side edges of bed plate 33, they are received in a lower hopper 72. Prunes which fall into hopper 72 are recirculated back into the hopper 32 by means of a standard conveyor, not shown.

When a prune comes to rest upon concave surface 65 of plate 33, it is then contacted by the rotating rollers 58 of turret 26. The clearance or spacing between rollers 58, rollers 37 and the surface 65 is determined so that the prunes are rolled into substantially cylindrical shapes. Moreover, the rolling action of rollers 58 tends to centralize the pit of the prune both axially and radially relative to the flesh of the prune, thus preparing the prune for pitting as performed by the apparatus 11.

A final longitudinal alignment of the prune is effected by the stationary guides 35 and 36, and immediately thereafter the prune is deposited onto support shelf 38 where it subsequently is picked off by a fruit receiving bucket of the pitting machine.

*Description of pitting apparatus*

Figure 10:
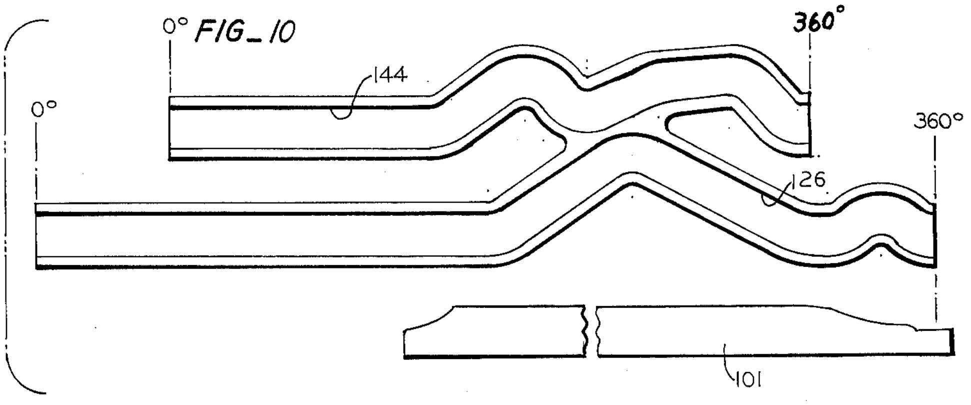
FIG. 10 is an extended plan view of the camming surfaces which control the movements of the gripping fingers, the pitting plungers and the axial movement of the buckets.
Figures 3, 7:
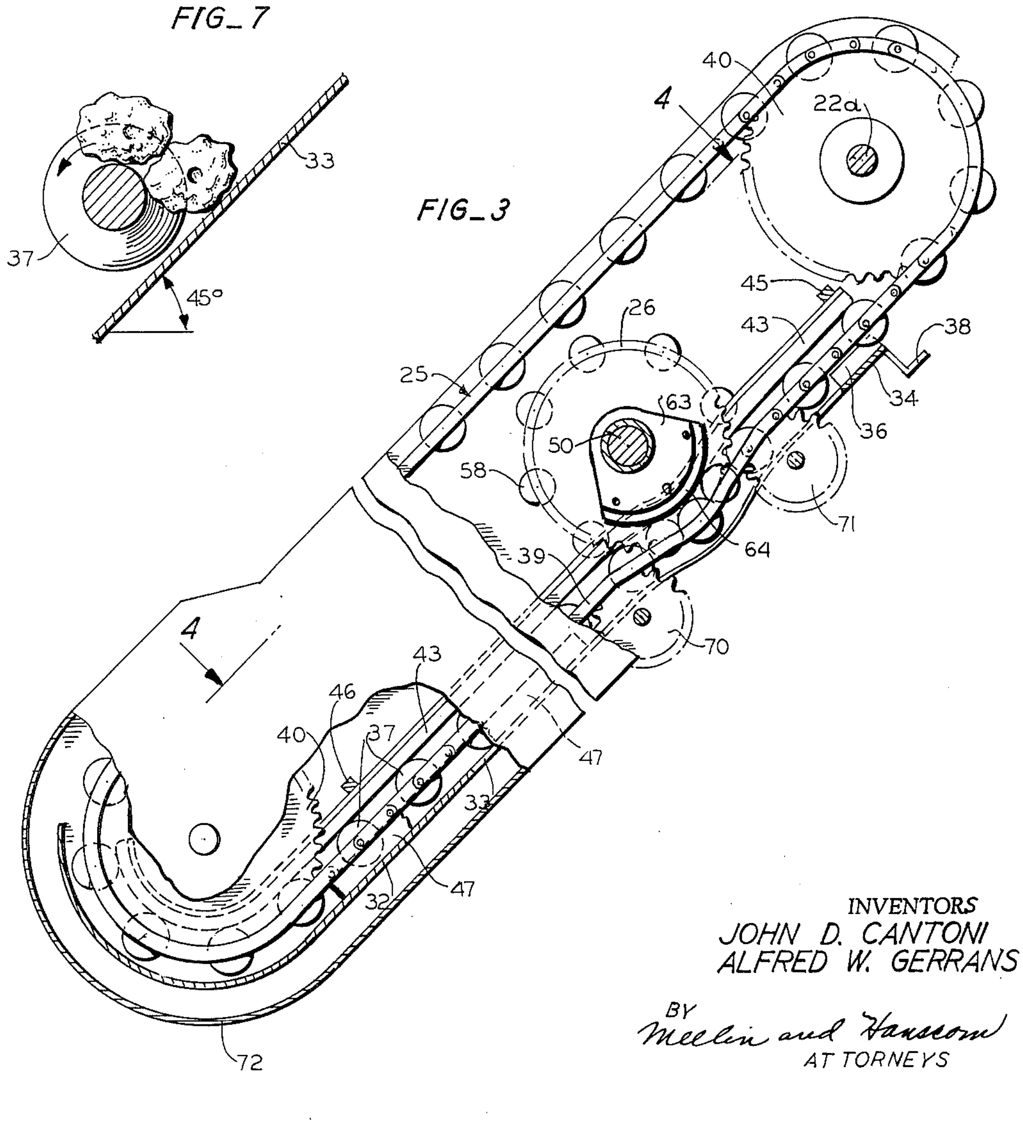
FIG. 3 is a side elevation of the fruit orienting and shaping apparatus with parts broken away and shown in sections.
FIG. 7 is an operational view illustrating the manner in which a single prune is selected by the roller conveyor of the orienting apparatus.
Figure 4:
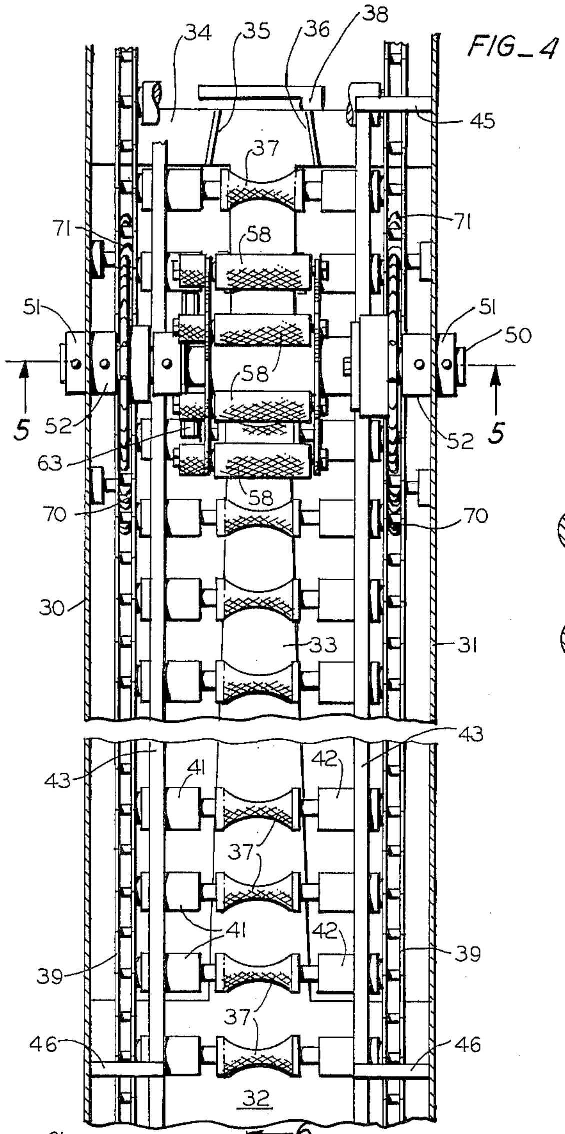
FIG. 4 is a section taken along lines 4—4 of FIG. 3.
Figures 8, 9:
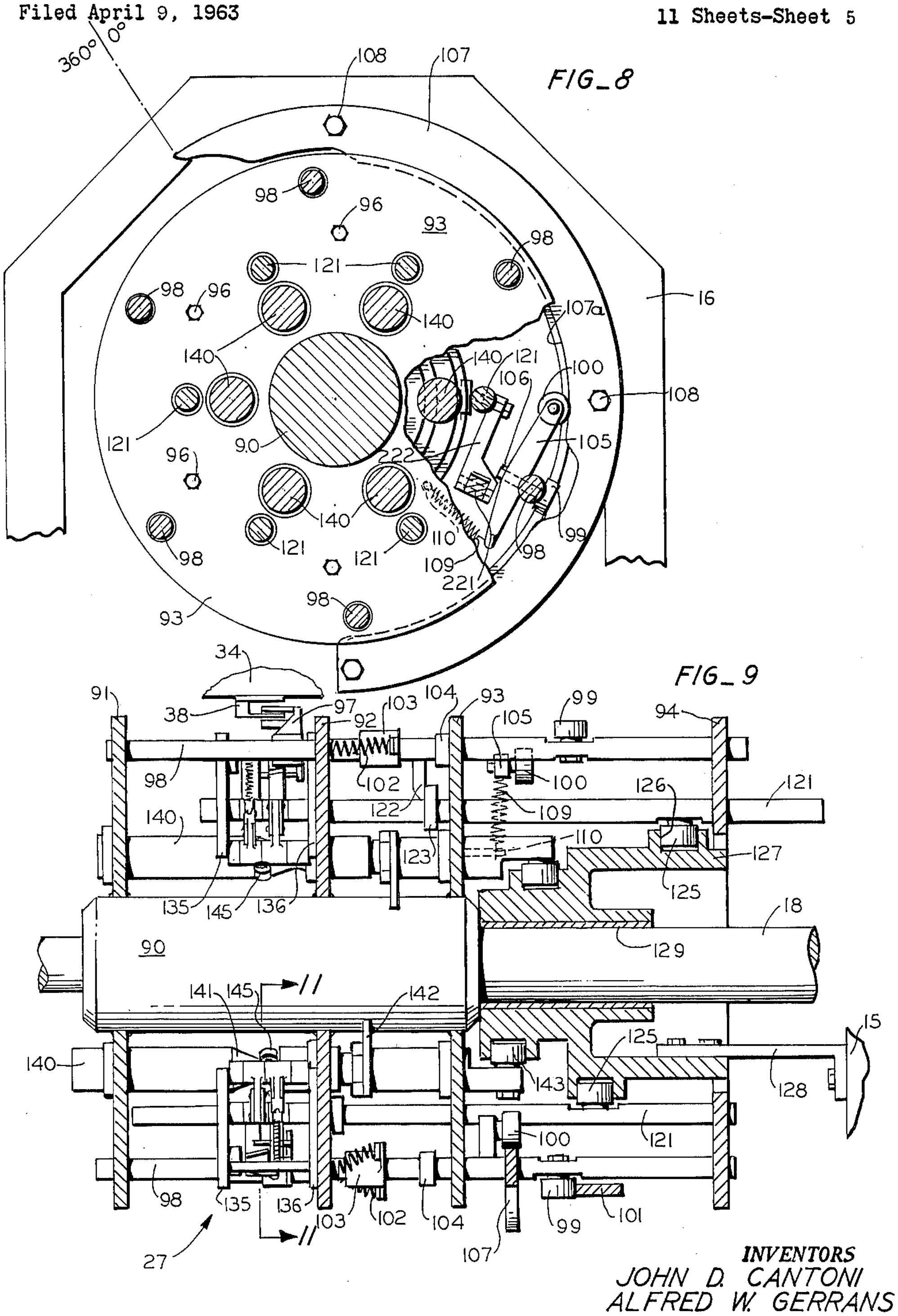
FIG. 8 is a section taken on lines 8—8 of FIG. 2.
FIG. 9 is a section taken on lines 9—9 of FIG. 1, showing details of the pitting turret head.

Referring to FIGS. 2 and 9 in particular, the rotatable pitting turret 27 comprises a mounting arbor 90 to which there is affixed parallel supporting plates 91, 92 and 93. A fourth parallel supporting plate 94 is supported in axial space relation from plate 93 by means of spacer rods 95 secured intermediate plates 93 and 94 by means of bolts 96. A plurality of fruit receiving buckets 97 are mounted on supporting shafts 98, each bucket being disposed intermediate plates 91 and 92. Supporting shafts 98 are received through coaxial openings in plates 91, 92, 93 and 94, and each shaft is adapted to be moved axially relative to its length as well as being pivoted upon its supporting plates. For this purpose, each shaft 98 supports a pair of roller cam followers 99 and 100, each cam follower being adapted for engaging a stationary cam surface hereinafter described. Roller followers 99 are mounted on an axis normal to the axis of shaft 98 from which it is supported, and each roller engages the surface of a cam member 101 while the turret head 27 is being rotated. The profile of cam 101, as shown in FIG. 10, will cause each shaft 98 to be moved toward the left, as shown in FIG. 9, during a portion of each turret rotation. In being so moved, shafts 98 move against the resilient bias imposed by respective pairs of springs 102, each pair of springs being disposed between and secured to plates 92 and the flanges of collars 103. Collars 103, of course, are secured to shaft 98 as by means of a set screw. Stop collars 104 are secured to shafts 98 to limit the axial movement of shafts in a direction which relieves the biasing force of springs 102.

Referring to FIG. 8 in particular, rollers 100 are rotatably mounted upon an arm 105 rigidly secured to shaft 98 by means of bolts 106. Rollers 100 are urged into surface engagement with an arcuate cam plate 107, mounted to frame 16 by means of bolt connections 108. Rollers 100 are urged against the camming surface 107*a* of cam plate 107 by springs 109 having one end hooked to the end of arm 105 and the other end hooked to a pin 110 mounted to plate 93.

Figures 11, 12:
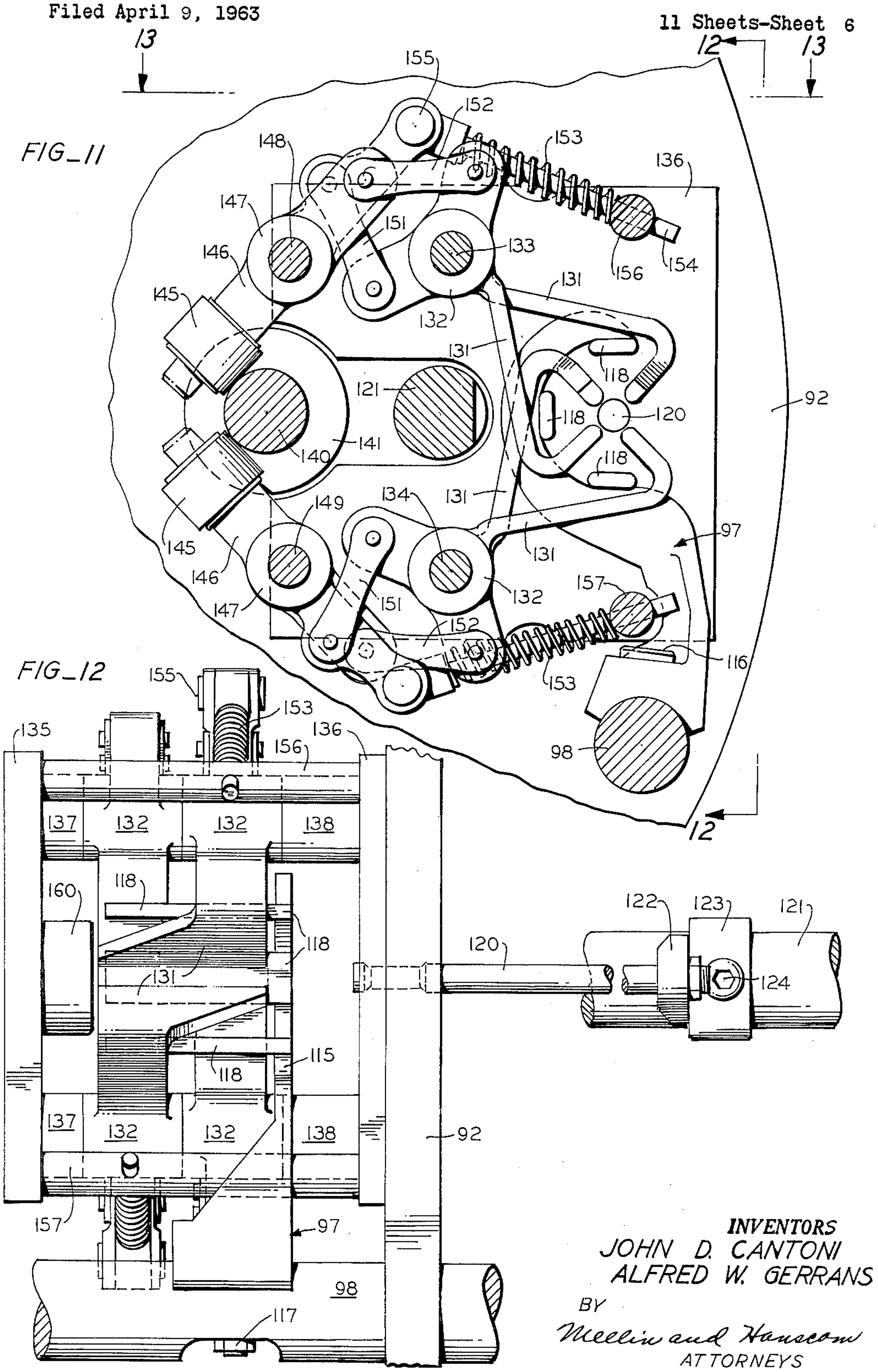
FIG. 11 is an enlarged detail view of the positioning and clamping mechanism and taken as a substantial section along lines 11—11 of FIG. 9.
FIG. 12 is a detail view along lines 12—12 of FIG. 11.

Referring to FIGS. 11 and 12 in particular, the fruit receiving buckets 97 comprise a support bracket arm 115 mounted to shaft 98 by means of a through bolt 116 and a nut 117. Three supporting fingers 118 are secured at one end to bracket arm 115 and extend in directions parallel with supporting shaft 98. It will be noted that each of the fingers 118 is relatively narrow and they are spaced in a manner that allows bucket 97 to be moved through the supporting plane of the bifurcated support shelf 38, as shown in FIG. 9.

Turret head 27 further comprises a number of pitting plungers 120 supported for axial movement on rods 121, each rod 121 being mounted and reciprocally movable through coaxial openings provided in plates 92, 93 and 94. Plungers 120 are mounted to rods 121 upon an arm 122 secured to each rod 121 by a collar 123 having a set screw 124. The position of collar 123 along shaft 121 may be adjusted to move the pitting plunger 120, either to the left or right, as shown in FIG. 12, without disturbing the mounting of shaft 121, which is reciprocally guided by a guide bar 221 and a yoke 222.

Each shaft 121 is adapted to be moved axially by a roller cam follower 125, and is received in a continuous cam recess 126 formed in a cylindrical cam housing 127. Housing 127 is supported in a stationary position from the end frame 15 by a support arm 128. The housing is also supported in part by the shaft 18 which extends through a bearing sleeve 129 disposed coaxially of the housing. It will be evident that as the turret head 27 rotates relative to the stationary cam housing 127, rods 121 will be moved axially in a manner determined by the shape of cam recess 126, best shown in FIG. 10.

Figure 13:
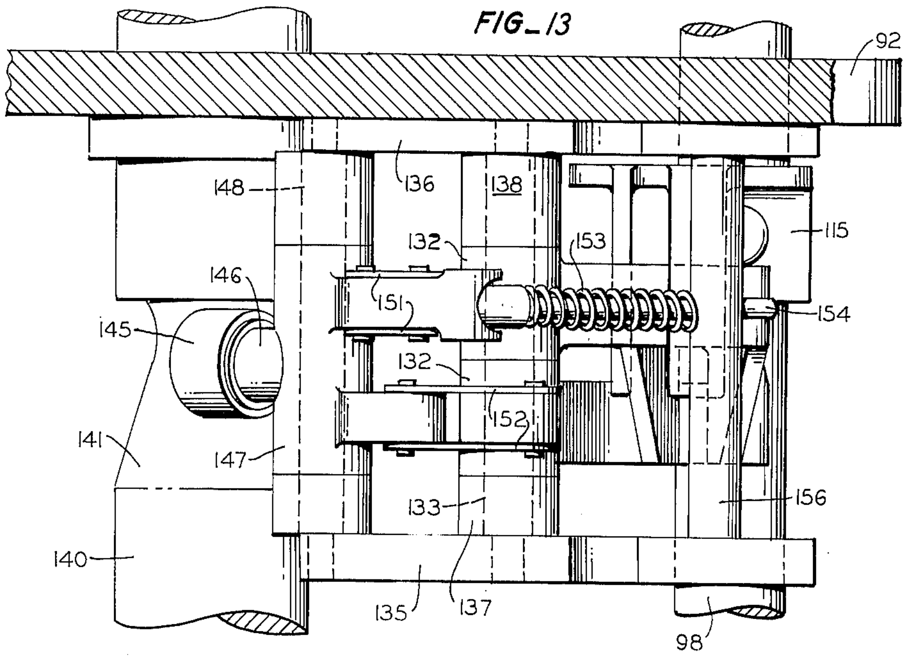
FIG. 13 is a detail and plan view as seen along lines 13—13 of FIG. 11.

Referring to the enlarged detail views of FIGS. 11, 12 and 13 in particular, a group of four gripping fingers 131 are mounted in proximate relation to each fruit receiving bucket 97. Each finger is integrally formed with a mounting sleeve 132, and the fingers are arranged in pairs and supported on shafts 133 and 134, both shafts extending between a pair of mounting plates 135 and 136. Spacer sleeves 137 and 138 position the gripping fingers intermediate plates 135 and 136.

Each of the fingers 131 of a group of fingers is adapted to be pivoted upon its mounting shaft 133 or 134 from open positions toward positions of fruit engagement by means of an actuating mechanism including a control cam shaft 140. Shaft 140 has a tapered cam surface 141 and is mounted for reciprocal movement through openings in plates 91, 92 and 93. Shaft 140 also carries an arcuate guide plate 142 which rides along the peripheral surface of mounting sleeve 90.

A roller member 143 rotatably supported at the end of shaft 140 is disposed in a continuous camming recess 144 formed in the periphery of housing 127. It will be evident that rotational movement of turret 27 relative to housing 127 produces axial reciprocation of each shaft 140. In being so moved a pair of roller members 145 engaged with cam surface 141 causes the gripping fingers 131 to be pivoted upon their support shafts 133 and 134.

Referring again to FIG. 11, rollers 145 are mounted to an arm 146 secured to a sleeve 147 mounted on a support shaft, either shaft 148 or shaft 149. The sleeve 147 which is supported on shaft 148 is adapted for moving that pair of gripping fingers supported upon shafts 133. Similarly, the sleeve 147 mounted on shaft 149 operates those gripping fingers mounted upon shaft 134. Each gripping finger is pin connected to an actuating sleeve 147 by pairs of links 151 or links 152.

Actuating sleeves 147 are urged in a direction holding the rollers 145 against the surface 141 by means of compression springs 153, each spring being mounted on a rod 154 pivoted to a sleeve 147 by means of a pin 155. The other end of each rod 154 is loosely received through an opening formed through one of two support shafts 156 and 157, said shafts being mounted between plates 135 and 136.

It will be particularly noted that the pairs of fingers of each group which are mounted upon the same shaft 133 or 134 are diametrically opposed, each pair of opposed gripping fingers being generally pivoted toward an axis of convergency. Although each pair of opposed gripping fingers is controlled by the same cam surface 141 and is adapted to be moved simultaneously with corresponding movement, each of the opposed pairs may move independently of the other opposed pair. Therefore, each pair of opposed fingers will be clamped upon a piece of fruit with substantially equal force and as determined by their respective biasing springs 153. Moreover, the gripping positions of each pair of opposed fingers will be independent of the gripping positions of the other pair.

Figures 16, 17, 20, 21:
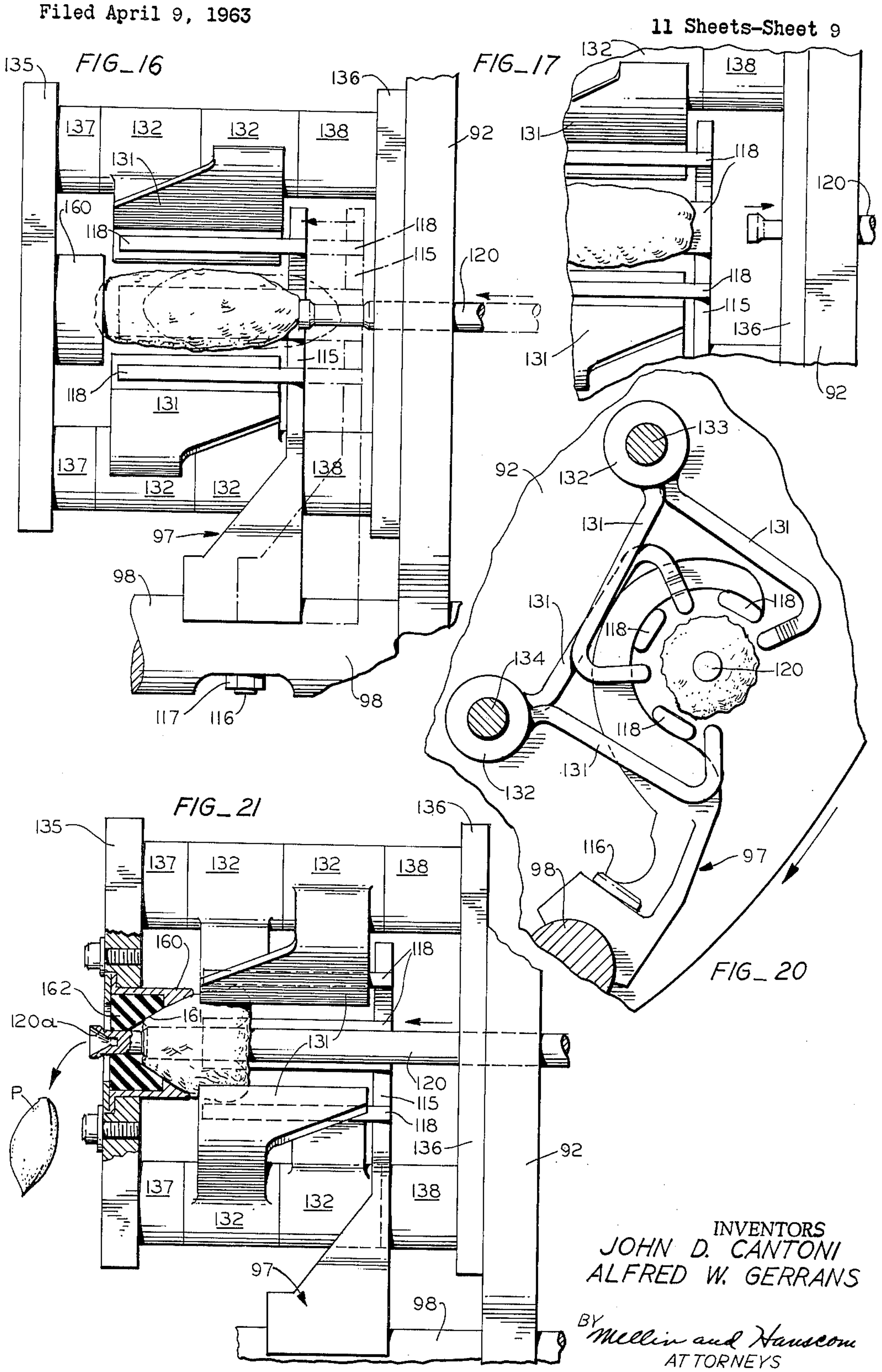
FIG. 16 is a plan view and detail of the bucket, associated gripping fingers and the pitting plunger at a time shortly after the bucket has been lowered into the position shown in FIG. 15.
FIG. 17 is a detail view similar to FIG. 16, showing the pitting plunger being retracted after the fruit has been moved toward the left.
FIG. 20 is a side view and detail showing the position of the gripping fingers and bucket during the pitting operation.
FIG. 21 is a detail view of the pitting operation while the fruit is in the pit extractor and immediately after the pit has been pushed therethrough.

Referring to FIGS. 12 and 21, a pit extruder 160 is mounted to each plate 135. Extruder dies 160 are shaped with a conical surface 161, and comprising a resilient abutment 162 having an opening therethrough through which a pit P may be forced by a tip 120*a* of the pitting plunger 120. The tip 120*a* is preferably formed with an interior conical surface which will engage the elliptical end of the prune pit to center the pit.

The operation of the pitting apparatus will be best understood in view of FIGS. 14–27. FIG. 27 will be particularly useful in following one complete cycle of pitting operation.

Figures 14, 15, 18, 19:
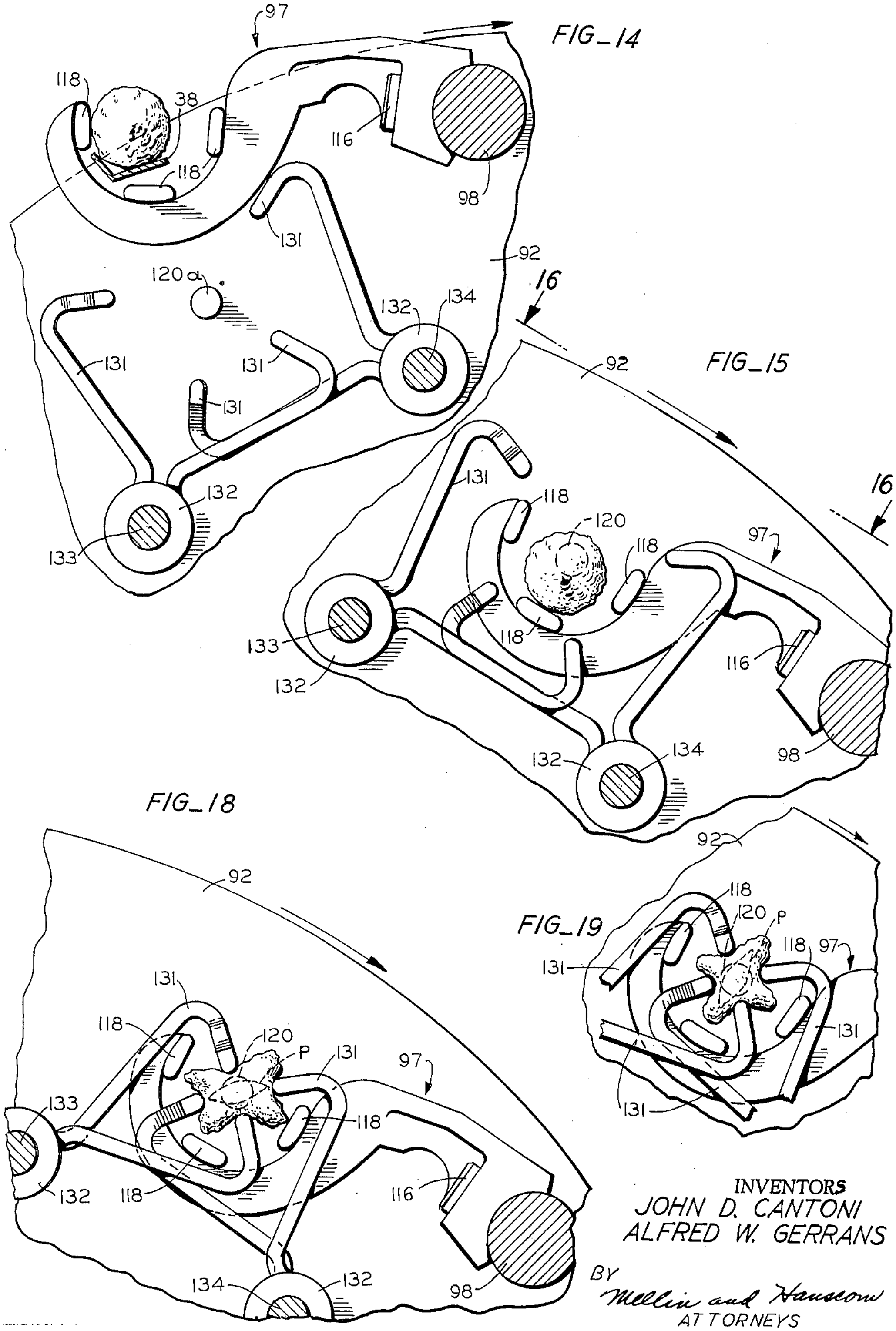
FIG. 14 is a side elevation and detail of a bucket and associated gripping fingers at a time immediately before transfer is made from the support shelf of the fruit orienting and shaping apparatus.
FIG. 15 is a side elevation and detail of the bucket and associated gripping fingers shortly after transfer is made from the platform and after the bucket has been lowered into position where the fruit may be gripped by the gripping fingers.
FIGS. 18 and 19 are detail views in sequence showing the manner in which the gripping fingers orient the pit relative to the flesh of the fruit and the pitting plunger immediately before pitting.

As previously explained, turret head 27 is rotated synchronously with the advancement of prunes along roller conveyor 25, and as soon as a prune is deposited onto the bifurcated support shelf 38 a fruit receiving bucket 97 is moved upward by rotation of the turret head causing the piece of fruit resting on the shelf 38 to be picked up by the fingers 118 of the bucket. The positional relationship between the support shelf 38, a bucket 97 and its associated gripping fingers 131 at a time immediately before fruit transfer is shown in FIG. 14. In this position of bucket movement, bucket 97 has been pivoted into a raised position by the resilient bias of spring 109. Gripping fingers 131 are then held in an open position by the contact between rollers 145 and the high portion of cam surface 141. Springs 153, which normally urge the gripping fingers toward a closed position, are at this time compressed.

Immediately after a prune has been transferred from the shelf 38 to a bucket 97, the bucket is pivoted into a lower position, as shown in FIG. 15, while gripping fingers 131 are retained in open positions. Soon after bucket 97 has been lowered, it is moved axially in the direction of the pit extruder 160 by the camming action of roller 99 riding along the surface of cam 101. Simultaneously, the pitting plunger 120 is moved into engagement with the supported prune, moving the prune against the die 160. This operation is best shown in FIG. 16.

FIG. 17 shows that the pitting plunger 120 is retracted after the fruit has been axially positioned relative to the die 160, and immediately thereafter gripping fingers 131 are allowed to close upon the supported fruit. Referring to FIGS. 18 and 19, it will be noted that the diametrically opposed pairs of gripping fingers center the pit relative to the flesh and also relative to the pitting plunger. Moreover, since the fingers are actuated in pairs rather than all together, they will center the pit regardless of its position. Since the ends of fingers 131 are relatively narrow, the skin and flesh is easily depressed, and the contacting surfaces of the fingers are allowed to move close to the prune pit, thereby insuring proper alignment.

Immediately after the prune pit has been aligned, pitting plunger 120 is brought into contact with the end of the prune, forcing the prune into the extruder cup or the conical surface 161 of the extruder die 160. As the tip 120*a* of pitting plunger 120 enters the prune it centers the pit by virtue of its conical shaped surface. Simultaneously, gripping fingers 131 are partially retracted, thereby allowing the prune to expand. It is to be understood, of course, that the resistance of the pit to being extracted from the flesh will cause an expansion of the prune, and in order to prevent unnecessary tearing of the prune flesh it must be allowed to expand. The position of the gripping fingers 131 and the position of the pitting plunger 120 during the pitting operation is illustrated in FIGS. 20 and 21.

Figures 22, 23, 24, 25:
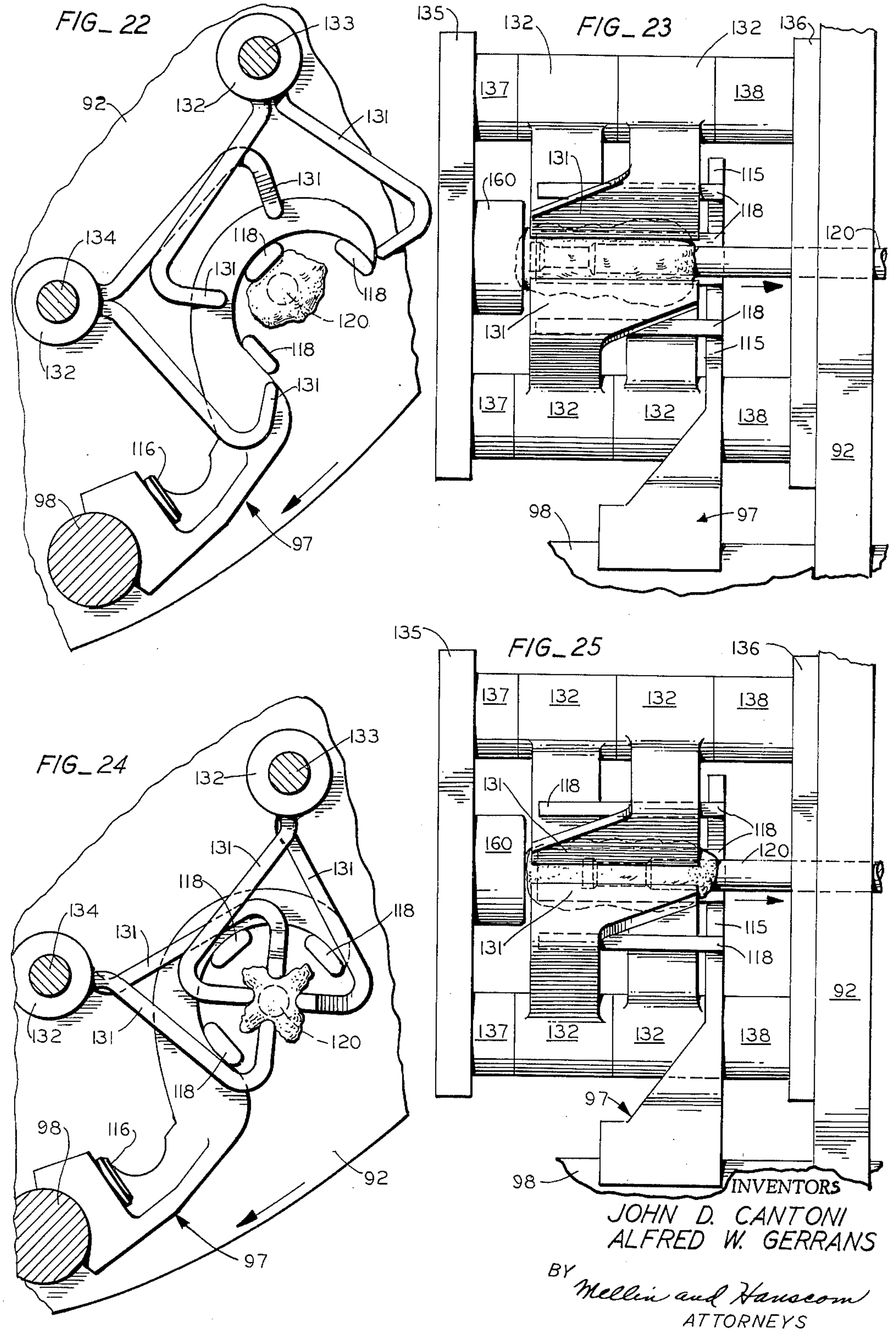
FIGS. 22 and 23 are elevations and details of the bucket and gripping fingers as the pitting plunger begins its retraction.
FIGS. 24 and 25 are elevations and detail views showing the position of the gripping fingers relative to the bucket as the pitting plunger is midway through its retraction.

After the prune has been pitted, the pitting plunger 120 is retracted, but not until the bucket 97 has been pivoted outwards slightly so as to contact the prune with its bottom finger 118, as shown in FIG. 22. At this time, the gripping fingers 131 have been moved to fully retracted positions. The pitted prune is then extracted from die 160 by the axial movement of bucket 97 which moves at substantially the same speed as the pitting plunger 120. As soon as the bucket has returned to its original starting position, it retracts to a bottom position, as shown in FIGS. 24 and 25, and after the bucket has been lowered gripping fingers 131 again reclamp the prune to hold it while the pitting plunger 120 completes its retraction and returns to its starting position.

Importantly, the reclamping action of gripping fingers 131 reshapes the prune to its original elongated shape, partially closing the two openings caused by the pitting plunger and the extraction of the prune pit. As a consequence, the prune will have a better appearance and will be a more appealing product.

Figure 26:
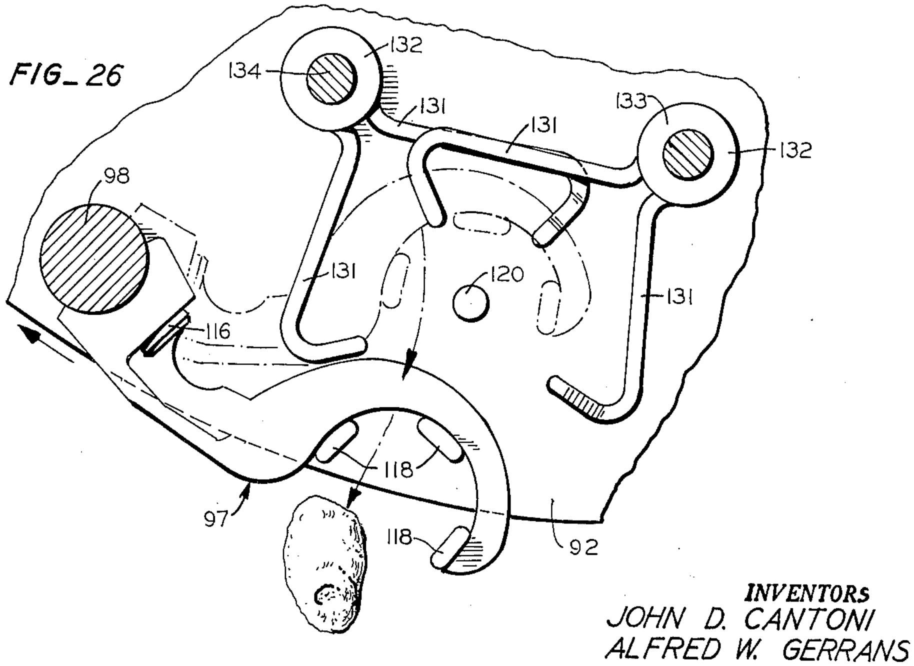
FIG. 26 is an elevation of the bucket and gripping fingers after the pitting plunger has been fully retracted and at a time that the flesh of the fruit is being discharged from the bucket.
Figure 27:
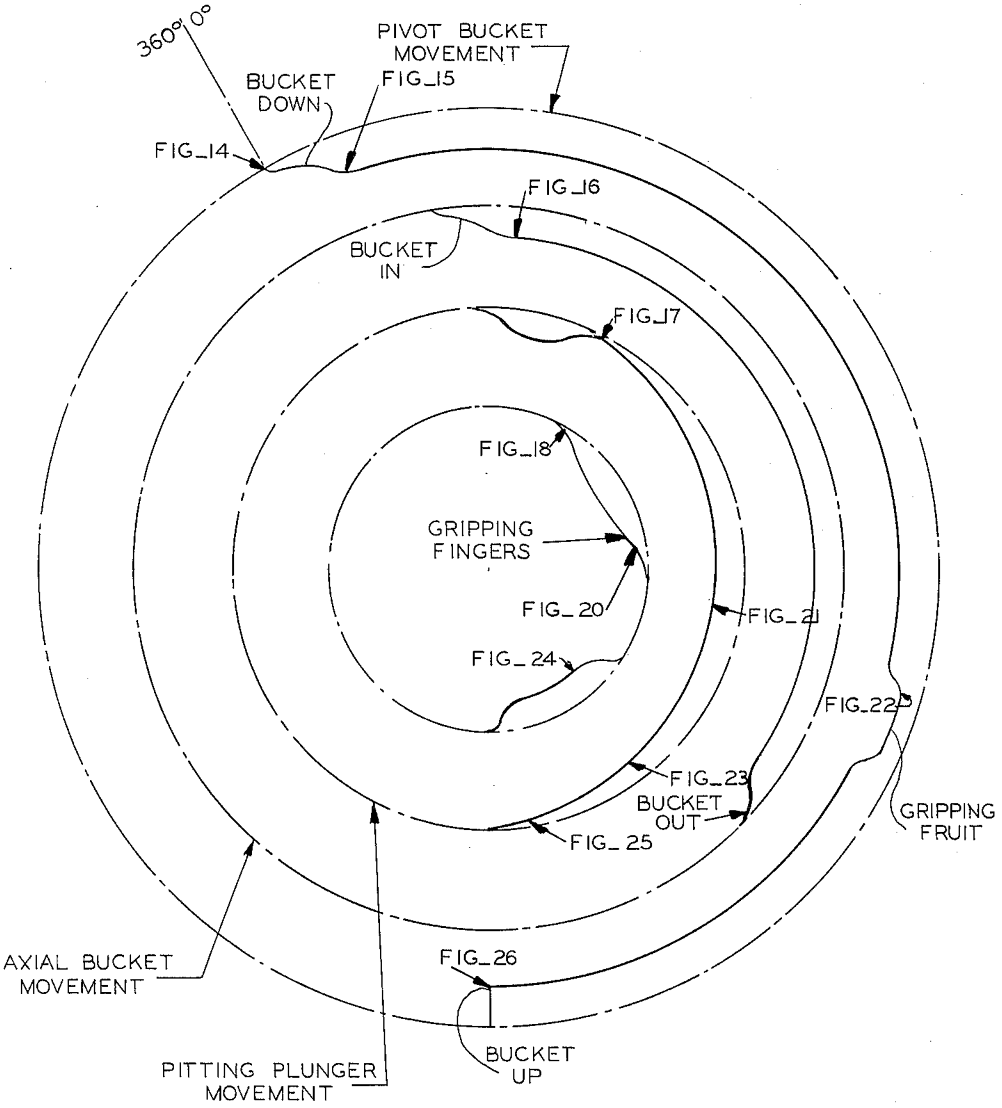
FIG. 27 is a diagrammatic view illustrating the time sequence of operation for the buckets, the gripping fingers and the pitting plungers of the pitting turret.

FIG. 26 illustrates the final movement in the pitting operation, whereby gripping fingers 131 are fully opened to permit bucket 97 to be snapped outwardly into an up position, thereby discharging the pitted prune. With reference to FIG. 27, it will be noted that a complete pitting operation takes place in substantially 180° rotation of the pitting turret 27. Furthermore, the pitted prunes are discharged while the buckets 97 are in an upside down position near the bottom of the turret, thereby facilitating a discharge of the pitted prunes.

Although one preferred embodiment of this invention has been illustrated and described, it is to be understood that various changes may be made without departing from the spirit of the invention or the scope of the attached claims, and each of such changes is contemplated.

What we claim and desire to secure by Letters Patent is:

1. A machine for shaping and pitting drupaceous fruit, comprising: a fruit supporting plate; a roller conveyor supported above said plate including a chain of roller members spaced equal distances apart; means for rotating said roller members as said chain is moved longitudinally along said support plate; a roller turret having a plurality of turret rollers rotatably supported radially of a turret axis of rotation, said axis being substantially normal to the direction of chain movement and located above said support plate and roller conveyor, said turret rollers being supported radially in a path which will bring each roller into positions spaced from but adjacent said support plate, said turret rollers being spaced angular distances apart approximately equal to the distance between roller members; means for rotating said turret to bring said turret rollers into positions between two adjacent roller members; means for rotating said turret rollers during at least that portion of their movement about the turret axis which brings them into said positions; a slotted support shelf disposed at the upper end of said support plate for receiving frut moved by said roller conveyor; a fruit receiving bucket, mean for moving said bucket to pick up fruit placed upon said support shelf, and means for pitting said fruit while it is supported upon said bucket.

2. A machine for shaping and pitting drupaceous fruit, comprising: a fruit supporting plate; a roller conveyor supported above said plate including a chain of roller members spaced equal distances apart; means for rotating said roller members as said chain is moved longitudinally along said support plate; a roller turret having a plurality of turret rollers rotatably supported radially of a turret axis of rotation, said axis being substantially normal to the direction of chain movement and located above said support plate and roller conveyor, said turret rollers being supported radially in a path which will bring each roller into positions spaecd from but adjacent said support plate, said turret rollers being spaced angular distances apart approximately equal to the distance between roller members; means for rotating said turret to bring said turret rollers into positions between two adjacent roller members, means for rotating said turret rollers during at least that portion of their movement about the turret axis which brings them into said positions; a slotted support shelf disposed at the upper end of said support plate for receiving fruit moved by said roller conveyor; a pitting turret having a plurality of fruit receiving buckets, said turret being rotatably supported upon a horizontal axis; means for synchronously rotating said turret relative to the movement of said roller conveyor to move the fruit receiving buckets into a position for picking up fruit placed upon said support shelf before another piece of fruit is placed thereon; and means associated with each fruit receiving bucket for pitting the fruit supported thereon while said turret is being rotated.

3. The apparatus of claim 2 wherein said fruit supporting plate and roller conveyor are inclined at a vertical angle such that the weight of fruit supported upon said roller members will be less than but approximately equal to the weight of fruit supported upon said plate.

4. The apparatus of claim 2 wherein said fruit supporting plate and roller conveyor are inclined vertically at an angle of approximately 45°.

5. The apparatus of claim 2 wherein said fruit supporting plate includes a concave surface portion, the curvature of said surface being generated from the axis of roller turret rotation, said turret rollers passing above and within the surface of said concave surface.

6. The apparatus of claim 2 wherein said roller members and turret rollers are rotated in a manner to sweep fruit along the supporting plate in the direction of the roller conveyor's longitudinal movement.

7. The apparatus of claim 2 and further including a fruit hopper disposed at the lower end of said fruit supporting plate, the roller members of said roller conveyor passing through said hopper to carry fruit therefrom and transport same along said plate.

8. A fruit orienting and shaping apparatus comprising: a fruit supporting plate; a roller conveyor supported above said plate including a chain of roller members; means for moving said roller members longitudinally along said support plate and for rotating said roller members as the chain of roller members is moved along said support plate; a turret having a plurality of turret rollers rotatably supported radially of a turret axis of rotation, said axis being substantially normal to the direction of chain movement and located above said plate and roller conveyor, said turret rollers being supported radially in a path which will bring each roller into positions spaced from but adjacent said plate; means for rotating said turret to bring said turret rollers sequentially into said positions and between two adjacent roller members of said chain; and means for rotating said roller members during at least that portion of their movement about the turret axis which brings them into said positions.

9. The apparatus of claim 8 wherein said fruit supporting plate and roller conveyor are inclined at an angle such that the weight of a single piece of fruit supported upon a roller member will be less than but approximately equal to the weight of fruit supported upon said plate.

10. The apparatus of claim 8 wherein said fruit supporting plate and roller conveyor are inclined vertically at an angle of approximately 45°.

11. The apparatus of claim 8 wherein said roller members of said chain are formed with a concave cylindrical surface.

12. The apparatus of claim 8 wherein said fruit supporting plate inludes a concave surface portion, the curvature of said surface being generated from the axis of turret rotation, said turret rollers passing above and within the concave surface.

13. The apparatus of claim 8 wherein said roller members and turret rollers are rotated in a manner to sweep fruit along the supporting plate in the direction of the roller conveyor's longitudinal movement.

14. A fruit orienting and shaping apparatus comprising: a fruit supporting plate having a vertically inclined supporting surface; a vertically inclined roller conveyor supported above said plate including a plurality of roller members; the supporting surface of said plate and said roller conveyor being inclined at an angle such that the weight of single pieces of fruit supported upon a roller member will be less than but approximately equal to the weight of fruit supported upon said plate, said fruit supporting plate and roller conveyor being inclined vertically at an angle of approximately 45°; means for moving said roller conveyor generally upward and longitudinally relative to said support plate; and means for rotating said roller members to sweep fruit along the supporting plate in the direction of the roller conveyor's longitudinal movement relative to said plate.

15. The apparatus of claim 14 wherein said roller members of said chain are formed with a concave cylindrical surface.

16. A fruit orienting and shaping apparatus comprising: a fruit supporting plate having a vertically inclined supporting surface; a vertically inclined roller conveyor supported above said plate including a plurality of roller members; the supporting surface of said plate and said roller conveyor being inclined at an angle such that the weight of single pieces of fruit supported upon a roller member will be less than but approximately equal to the weight of fruit supported upon said plate; means for moving said roller conveyor generally upward and longitudinally relative to said support plate; means for rotating said roller members to sweep fruit along the supporting plate in the direction of the roller conveyor's longitudinal movement relative to said plate; a turret having a plurality of turret rollers rotatably supported radially of a turret axis of rotation, said axis being substantially normal to the direction of relative movement between said roller conveyor and said support plate, said turret rollers being supported radially in a path which will bring each roller into positions spaced from but adjacent said plate; means for rotating said turret to bring said turret rollers sequentially into said positions and between two adjacent roller members of said roller conveyor, and means for rotating said roller members during at least that portion of their movement about the turret axis which brings them into said positions.

17. The apparatus of claim 16 wherein said fruit supporting plate includes a concave surface portion, the curvature of said surface being generated from the axis of turret rotation, said turret rollers passing above and within the concave surface.

18. A method for selecting and shaping dried drupaceous fruit preparatory to pitting, comprising the steps: rolling pieces of fruit along a vertically inclined supporting surface and confining said pieces of fruit between rotating rollers and said supporting surface while said fruit is being rolled along a portion of said surface.

19. A method for selecting and shaping dried drupaceous fruit preparatory to pitting, comprising the steps: relatively rolling pieces of fruit upwardly along a vertically inclined supporting surface of approximately 45° while supporting each piece against a roller member, then confining said pieces of fruit between rotating rollers and said supporting surface while said fruit is being relatively rolled along a portion of said surface.

20. Apparatus for pitting drupaceous fruit, comprising: a fruit receiving bucket, means for pivoting said bucket upon a pivot axis, means for reciprocally moving said bucket in a direction parallel to its pivot axis; a pitting plunger, means for reciprocally moving said pitting plunger in a direction parallel to said pivot axis; a pitting die having an opening coaxial with said pitting plunger; fruit gripping fingers, and means for moving said gripping fingers into and away from engaging contact with fruit supported in said bucket.

21. The apparatus of claim 20 wherein said means for pivoting said bucket is operated by a cam surface that produces cyclical bucket movement from a starting position, pivoting said bucket into an up position for receiving fruit from a support shelf, lowering said bucket to place fruit supported thereon coaxial with said pitting plunger, raising said bucket to contact the supported fruit during retraction of the pitting plunger, lowering said bucket to allow gripping by said gripping fingers, and raising said bucket to its starting position.

22. The apparatus of claim 20 wherein said means for reciprocally moving said bucket is operated by a cam surface that produces cyclical bucket movement from a starting position, moving said bucket laterally into a position adjacent to said pitting die, and laterally returning said bucket to its starting position after completion of the pitting operation.

23. The apparatus of claim 20 wherein said means for reciprocally moving said pitting plunger is operated by a cam surface that produces cyclical bucket movement from a starting position, moving said pitting plunger laterally to initially position fruit supported in said bucket against said pitting die, laterally retracting said plunger to permit gripping of the fruit by said gripping fingers, laterally returning said plunger to effect pitting of said fruit, and retracting said plunger to its starting position.

24. The apparatus of claim 20 wherein said means for moving said gripping fingers is operated by a cam surface that produces cyclical movement of said fingers from a starting position, moving said fingers into engagement with fruit supported by said bucket after the fruit has been positioned against said pitting die, retracting said fingers prior to pitting of the fruit by said plunger, moving said fingers to regrip and shape the fruit after withdrawal of said plunger, and retracting said fingers to their starting position.

25. Apparatus for pitting drupaceous fruit, comprising: a support turret mounted upon a horizontal axis of rotation from a support frame; a plurality of fruit receiving buckets mounted upon said turret and disposed equal angular distances about said turret, each bucket being pivotally supported upon a pivot axis from a shaft which is reciprocally mounted upon an axis of reciprocation, said pivot axis and axis of reciprocation being parallel to said horizontal avis of rotation; means for cyclically pivoting each bucket upon its respective pivot axis; means for cyclically reciprocating each bucket upon its respective axis of reciprocation; a plurality of pitting plungers mounted upon said turret, each pitting plunger being reciprocally supported upon an axis of reciprocation parallel to said horizontal axis of rotation; means for cyclically reciprocating each pitting plunger upon its respective axis of reciprocation; a plurality of pitting dies, each die having a die opening and being mounted upon said turret with its opening coaxial with a pitting plunger; groups of gripping fingers mounted upon said turret, each group of fingers being associated with one of said buckets and plungers and movable into and from positions of engaging contact with fruit supported in the associated bucket; and means for cyclically moving each group of fingers into and away from said positions of engaging contact.

26. A method of pitting dried drupaceous fruit, comprising the steps of: rolling the fruit into a cylindrical form, gripping the fruit on more than two sides to center the stone relative to the flesh, forcing the stone from the flesh with a pitting plunger while relaxing the engagement of gripping to permit expansion of the flesh, then holding the expanded flesh while retracting the pitting plunger.

27. A method of pitting dried drupaceous fruit, comprising the steps of: rolling the fruit into a cylindrical form, placing the shaped fruit adjacent to a pitting die, gripping the fruit with more than two points of circumferential contact to center the stone relative to the flesh and to the pitting die, forcing the stone from the flesh with a pitting plunger while relaxing the engagement of gripping to permit expansion of the flesh, then holding the expanded fruit while retracting the pitting plunger.

28. A method of pitting dried drupaceous fruit, comprising the steps of: rolling the fruit into a cylindrical form, placing the shaped fruit adjacent to a pitting die, gripping the fruit on more than two sides to center the stone relative to the flesh and to the pitting die, forcing the stone from the flesh with a pitting plunger while relaxing the engagement of gripping to permit expansion of the flesh, holding the expanded flesh while retracting the pitting plunger, then regripping said flesh to reshape the fruit and close the opening through which the stone was expelled.

References Cited by the Examiner

UNITED STATES PATENTS

| | | | |
|---|---|---|---|
| 790,811 | 5/1905 | Alvey | 198—168 |
| 1,296,845 | 3/1919 | Parker | 194—183 X |
| 1,302,171 | 4/1919 | Johnson | 198—168 X |
| 1,418,572 | 6/1922 | Hoyt et al. | 198—168 |
| 1,822,382 | 9/1931 | Smith | 146—17 |
| 2,341,857 | 2/1944 | Drake | 146—27 |
| 2,685,313 | 8/1954 | Peel | 146—17 |
| 2,901,014 | 8/1959 | Coons et al. | 146—51 X |

ROBERT C. RIORDON, *Primary Examiner.*

J. SPENCER OVERHOLSER, *Examiner.*